(12) United States Patent
Jewell

(10) Patent No.: US 11,440,609 B2
(45) Date of Patent: Sep. 13, 2022

(54) CHILD VEHICLE WITH TOOL-LESS COMPONENTS AND ASSOCIATED METHODS

(71) Applicant: Huffy Corporation, Miamisburg, OH (US)

(72) Inventor: Jason Jewell, Dayton, OH (US)

(73) Assignee: Huffy Corporation, Miamisburg, OH (US)

( * ) Notice: Subject to any disclaimer, the term of this patent is extended or adjusted under 35 U.S.C. 154(b) by 67 days.

(21) Appl. No.: 16/892,367

(22) Filed: Jun. 4, 2020

(65) Prior Publication Data

US 2021/0031863 A1    Feb. 4, 2021

Related U.S. Application Data

(60) Provisional application No. 62/881,440, filed on Aug. 1, 2019.

(51) Int. Cl.

| | |
|---|---|
| *B62K 9/02* | (2006.01) |
| *B62K 3/00* | (2006.01) |
| *B62K 21/24* | (2006.01) |
| *B62K 19/32* | (2006.01) |
| *B62K 21/02* | (2006.01) |
| *F16B 13/08* | (2006.01) |
| *B62K 21/04* | (2006.01) |
| *B62K 21/12* | (2006.01) |

(52) U.S. Cl.
CPC .............. *B62K 21/02* (2013.01); *B62K 3/002* (2013.01); *B62K 9/02* (2013.01); *B62K 19/32* (2013.01); *B62K 21/04* (2013.01); *B62K 21/12* (2013.01); *B62K 21/24* (2013.01); *F16B 13/0891* (2013.01)

(58) Field of Classification Search
CPC ......... B62K 19/32; B62K 21/24; B62K 21/18
USPC ....................................................... 280/270
See application file for complete search history.

(56) References Cited

U.S. PATENT DOCUMENTS

| 1,379,305 A | 5/1921 | Johns |
| 1,514,720 A | 11/1924 | Pauly |

(Continued)

FOREIGN PATENT DOCUMENTS

| CN | 101519107 A | 9/2009 |
| GB | 2263258 A | 7/1993 |

(Continued)

*Primary Examiner* — Kevin Hurley
*Assistant Examiner* — Hosam Shabara
(74) *Attorney, Agent, or Firm* — Wood Herron & Evans LLP

(57) ABSTRACT

A child vehicle includes a front frame having a handlebar with a steering tube and a front fork having a fork stem and a front wheel, a rear frame including a head tube and a rear wheel, and a sleeve assembly mounted to the front frame and engaging the rear frame to rotatably connect the front and rear frames in a tool-less manner. A method of tool-less assembly of a child vehicle includes inserting an end of the fork stem through the head tube, sliding an inner sleeve over the end of the fork stem and positively connecting the inner sleeve to the fork stem, sliding the outer sleeve over an end of the steering tube, connecting the steering tube to the fork stem, and connecting the outer sleeve to the inner sleeve. A child vehicle having a rear wheel connected to the vehicle in a tool-less manner and a method of achieving such a tool-less connection is also disclosed.

34 Claims, 11 Drawing Sheets

(56) References Cited

U.S. PATENT DOCUMENTS

| | | |
|---|---|---|
| 1,531,916 A | 3/1925 | Flintjer |
| 1,653,583 A | 12/1927 | Paxson |
| 2,481,837 A | 9/1949 | Giese |
| D158,455 S | 5/1950 | Glamb |
| D176,037 S | 11/1955 | Rhoades |
| 3,158,964 A | 12/1964 | Haas |
| 4,079,957 A | 3/1978 | Blease |
| 4,657,270 A | 4/1987 | Allen et al. |
| 4,958,842 A | 9/1990 | Chang |
| D355,870 S | 2/1995 | Dieudonne |
| 5,440,950 A | 8/1995 | Tranvoiz |
| 5,441,289 A | 8/1995 | Spielberger |
| 6,443,033 B1 | 9/2002 | Brummer et al. |
| 6,612,201 B1 | 9/2003 | Chen |
| 6,685,206 B1 | 2/2004 | Blake |
| 6,685,207 B1 | 2/2004 | Blake |
| 6,695,327 B1 | 2/2004 | Maggiore et al. |
| 6,705,813 B2 | 3/2004 | Schwab |
| 6,708,998 B1 | 3/2004 | Blake |
| D494,509 S | 8/2004 | Chiappetta et al. |
| 6,783,314 B2 | 8/2004 | Gattone |
| 6,874,802 B2 * | 4/2005 | Gunter ............... B62H 7/00 280/288.4 |
| D518,417 S | 4/2006 | Oosterveer |
| D525,568 S | 7/2006 | Baron |
| 7,080,574 B2 | 7/2006 | Chang |
| 7,188,849 B2 | 3/2007 | Lee |
| 7,226,065 B2 | 6/2007 | Hutson |
| 7,455,308 B2 | 11/2008 | Michelau et al. |
| 7,487,982 B2 | 2/2009 | Chan |
| D589,851 S | 4/2009 | Jane Santamaria |
| D594,788 S | 6/2009 | Hartlaub et al. |
| 7,572,199 B1 | 8/2009 | Calendrille, Jr. |
| D630,158 S | 1/2011 | Jessie, Jr. |
| 8,408,094 B2 | 4/2013 | Chen |
| 8,500,134 B2 * | 8/2013 | Tzoreff ............... B62K 9/00 280/282 |
| 8,844,960 B2 * | 9/2014 | Young ............... B62K 15/00 280/278 |
| 9,643,672 B2 * | 5/2017 | Kettler ............... B62J 9/00 |
| 2001/0035626 A1 | 11/2001 | Kettler |
| 2003/0052471 A1 | 3/2003 | Grafton |
| 2004/0061304 A1 | 4/2004 | Lim |
| 2006/0186641 A1 | 8/2006 | Chan |
| 2008/0179850 A1 | 7/2008 | Catelli |
| 2010/0289244 A1 | 11/2010 | Grossman |
| 2013/0082451 A1 * | 4/2013 | Lin ............... B62K 13/00 280/87.021 |
| 2018/0022413 A1 * | 1/2018 | Kim ............... B62K 21/24 280/282 |

FOREIGN PATENT DOCUMENTS

| | | | |
|---|---|---|---|
| JP | 571089 | 9/1993 | |
| JP | 2000142526 | 5/2000 | |
| KR | 101553699 B1 * | 9/2015 | ............ B62K 21/24 |
| WO | WO-2015163557 A1 * | 10/2015 | ............ B62K 17/00 |

* cited by examiner

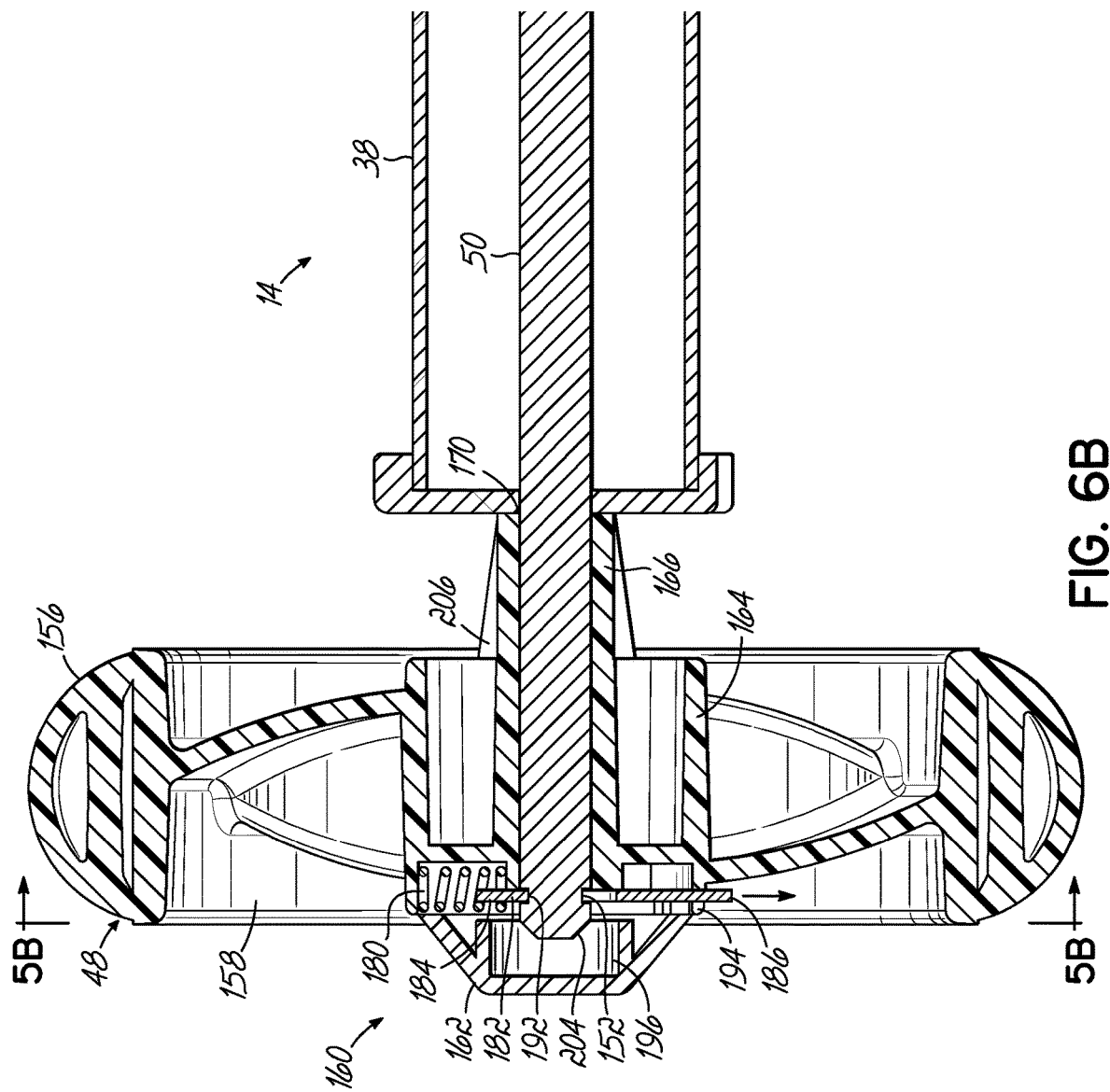

CHILD VEHICLE WITH TOOL-LESS COMPONENTS AND ASSOCIATED METHODS

CROSS REFERENCE TO RELATED APPLICATION

This application claims priority to U.S. Provisional Patent Application No. 62/881,440 filed on Aug. 1, 2019, the disclosure of which is incorporated by reference herein in its entirety.

TECHNICAL FIELD

The invention relates generally to child vehicles such as scooters, and more particularly to the assembly of various components of the child vehicle in a tool-less manner.

BACKGROUND

Scooters are among some of the most popular of today's outdoor toys for children and young adults. Such scooters are typically manufactured and shipped to various retail outlets for offering to end consumers. More recently, consumers have been purchasing scooters directly from the manufacturer or from online retail outlets. In any event, manufacturers attempt to package the scooter in an efficient and cost-effective manner. This often requires that various components of the scooter be packaged in an unassembled state such that subsequent assembly is required before the consumer may use the scooter. By way of example, the wheels, handlebars, base or deck, and other add-on features, may not come assembled to the scooter. While some retail outlets may offer a service of assembling the scooter for the consumer, in many cases, assembly of the scooter is being left to the end consumer.

Conventional assembly often requires a plethora of tools, such as wrenches, screw drivers, etc., for assembling the scooter. Accordingly, proper assembly relies on the consumer having the proper tools readily accessible. It can be frustrating when the consumer starts assembling the scooter but then learns that they lack the proper tools required to complete the assembly. Moreover, proper assembly of the scooter may be heavily dependent on the particular skill set of the person performing the assembly. Thus, even with the correct tools, proper assembly of the scooter may not be achieved. The improper assembly of the scooter may frustrate the consumer and result in negative product perception, phone calls or other communications from unsatisfied consumers at call-in or technical centers, or product return and a demand for a refund.

In view of the above, there is an increasing need for manufacturers to provide scooters that are easy to assemble and require a minimum number of tools.

SUMMARY

A child vehicle having tool-less assembly is disclosed. The child vehicle includes a front frame assembly including a handlebar with a steering tube and a front fork having a fork stem and a front wheel, a rear frame assembly including a head tube and at least one rear wheel, and a sleeve assembly mounted to the front frame assembly and engaging the rear frame assembly to rotatably connect the front and rear frame assemblies in a tool-less manner.

In one embodiment, the sleeve assembly includes an inner sleeve and an outer sleeve connected to the inner sleeve. For example, the inner and outer sleeves may connect through a threaded connection. The inner sleeve is positively connected to the front frame assembly by a first tool-less connector. In one embodiment, the first tool-less connector includes a spring clip on the inner sleeve and an aperture in the fork stem. The spring clip includes a spring bias such that when the spring clip engages the aperture, the spring clip moves and is received in the aperture, thereby positively connecting the inner sleeve and the fork stem. The inner sleeve includes a plurality of tabs which are configured to clamp on the front frame assembly when the outer sleeve is connected to the inner sleeve. More particularly, the plurality of tabs clamp on the steering tube when the outer sleeve is connected to the inner sleeve.

In one embodiment, the steering tube and the fork stem are positively connected together by a second tool-less connector. The second tool-less connector is disposed in the sleeve assembly when the front and rear frame assembles are rotatably connected together. The second tool-less connector includes a spring-biased push pin in one of the steering tube or fork stem and an aperture in the other of the steering tube or fork stem. When the push pin is received in the aperture, the steering tube and fork stem are positively connected together. Moreover, in one embodiment the inner sleeve includes an aperture and the push pin is received in the aperture of the inner sleeve when the front and rear frame assemblies are rotatably connected together. The outer sleeve is configured to cover the push pin when the outer sleeve is connected to the inner sleeve to prevent inadvertent detachment between the fork stem and the steering tube.

In an exemplary embodiment, the child vehicle may be a scooter. The scooter may have a deck attached to the rear frame assembly. The scooter may also have two rear wheels.

In a further embodiment, a method of tool-less assembly of a child vehicle is disclosed. The method includes providing a front frame assembly including a handlebar having a steering tube and a front fork having a fork stem and a front wheel; providing a rear frame assembly having a head tube and at least one rear wheel; and providing a sleeve assembly having an inner sleeve and an outer sleeve. The method further includes inserting an end of the fork stem through the head tube; sliding the inner sleeve over the end of the fork stem and positively connecting the inner sleeve to the fork stem in a tool-less manner, wherein a lower end of the head tube engages an abutment surface of the front fork and an upper end of the head tube engages the inner sleeve; sliding the outer sleeve over an end of the steering tube; connecting the steering tube to the fork stem in a tool-less manner; and connecting the outer sleeve to the inner sleeve.

In one embodiment, positively connecting the inner sleeve to the fork stem in a tool-less manner further includes providing the inner sleeve with a spring clip, providing the fork stem with an aperture, and engaging the spring clip with the aperture to positively connect the inner sleeve to the fork stem. Additionally, connecting the steering tube to the fork stem in a tool-less manner further includes providing one of the steering tube or fork stem with a spring-biased push pin, providing the other of the steering tube or fork stem with an aperture and engaging the push pin with the aperture to positively connect the steering tube and fork stem. In an exemplary embodiment, the method further includes engaging the push pin with an aperture in the inner sleeve and covering the push pin with the outer sleeve when the outer sleeve is connected to the inner sleeve. The inner sleeve includes a plurality of tabs and the method further includes clamping the plurality of tabs to the steering tube when the outer sleeve is connected to the inner sleeve.

In yet another embodiment, a child vehicle includes a front frame assembly having a handlebar, a front fork, and a front wheel, a rear frame assembly pivotally connected to the front frame assembly and having a rear wheel axle, and a rear wheel positively connected to the rear wheel axle by a tool-less connector.

In one embodiment, the tool-less connector includes a locking element carried by the rear wheel and moveable between a locked position and an unlocked position and a groove in the rear wheel axle. At least a portion of the locking element resides in the groove when in the locked position to thereby restrict movement of the rear wheel relative to the rear wheel axle, and no portion of the locking element resides in the groove when in the unlocked position to thereby allow movement of the rear wheel relative to the rear wheel axle. The tool-less connector further includes a spring member to bias the locking element toward the locked position. Furthermore, the tool-less connector may include a push pin for moving the locking element from the locked position to the unlocked position. In one embodiment, the locking element includes an oval aperture having a first portion with a first radius and a second portion with a second radius, wherein the second radius is smaller than the first radius. For example, the second radius is less than the radius of the rear wheel axle and greater than the radius of the groove. The rear wheel axle is generally positioned within the first portion of the oval aperture when the locking element is in the unlocked position, and the rear wheel axle is generally positioned in the second portion of the oval aperture when the locking element is in the locked position.

In another embodiment, a method of tool-less assembly of a child vehicle includes providing a front frame assembly including a handlebar, a front fork, and a front wheel; providing a rear frame assembly including a rear wheel axle; and providing a rear wheel including a central hub having a wheel mounting sleeve and a tool-less connector. The method further includes inserting an end of the rear wheel axle into the wheel mounting sleeve and connecting the rear wheel to the rear wheel axle using the tool-less connector.

In one embodiment, the tool-less connector includes a spring-biased locking element having a locked position and an unlocked position located in the central hub adjacent the wheel mounting sleeve and a groove formed in the rear wheel axle adjacent the end. The method further includes moving the locking element from the locked position to the unlocked position; inserting the rear wheel axle through an aperture in the locking element; and moving the locking element to the locked position to engage a portion of the locking element within the groove of the rear wheel axle. In one embodiment, moving the locking element from the locked position to the unlocked position further includes engaging the end of the rear wheel axle with the aperture in the locking element and moving the locking element from the locked position to the unlocked position by the engagement of the rear wheel axle with the aperture in the locking element. In another embodiment, moving the locking element from the locked position to the unlocked position further includes manually moving the locking element from the locked position to the unlocked position. In another embodiment, moving the locking element to the locked position further includes moving the locking element to the locked position under a spring biasing force.

In one embodiment, the method may further include pivotally connecting the front and rear frame assemblies together. This connection may be accomplished in a tool-less manner. The child vehicle may be a scooter.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 6B is another cross-sectional view showing the rear wheel assembled in a tool-less manner according to the embodiment shown in FIG. 4.

DETAILED DESCRIPTION

Aspects of the present disclosure are directed to the tool-less assembly of various scooter components. More particularly, aspects of the disclosure are directed to the tool-less assembly of a front frame to a rear frame and rear wheels to a rear frame for a scooter. As described above, these features may not come pre-assembled to the scooter but require some amount of assembly by the retail outlet or the end consumer. In this regard, FIGS. 3A-3E illustrate the elements and steps for achieving a tool-less assembly of a front frame to a rear frame of a scooter in accordance with an embodiment of the invention. FIGS. 4-6B then illustrate the elements and steps for achieving a tool-less assembly of rear wheels to a rear frame of a scooter in accordance with another embodiment of the invention. While aspects of the present invention will be described herein in the context of a scooter, it should be appreciated that other child vehicles, such as tricycles, ride-ons, or the like, having similar components may also benefit from aspects of the invention.

Figure 1:
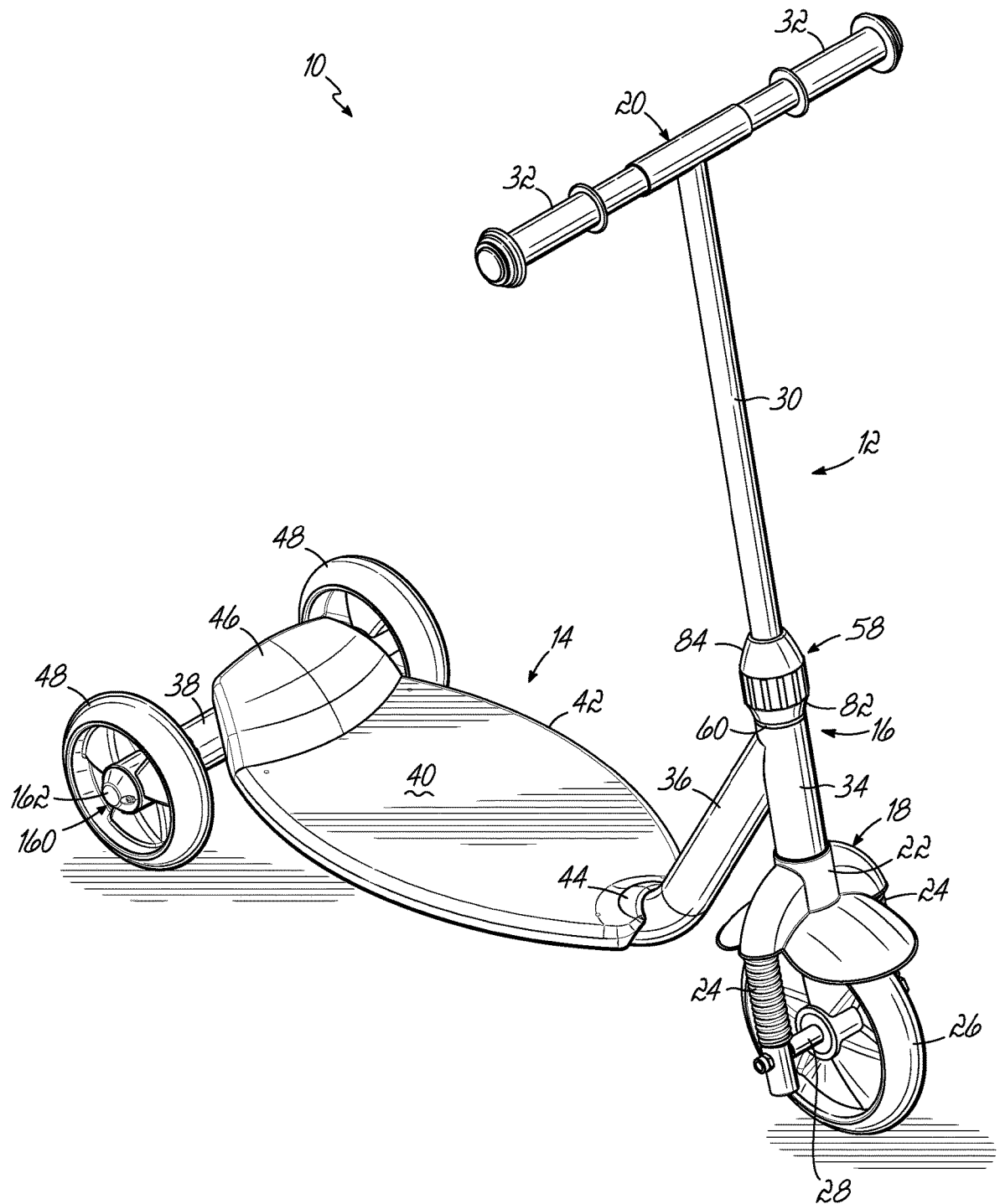
FIG. 1 is a front perspective view of a child vehicle in the form of a scooter in one embodiment in accordance with this invention.

Referring now to the drawings, FIG. 1 illustrates an exemplary embodiment of a child vehicle in accordance with aspects of the present invention. In this regard, FIG. 1 illustrates a scooter 10 in accordance with an embodiment of the invention. The scooter 10 includes a front frame 12 pivotally coupled to a rear frame 14 at a joint 16. The joint 16 is configured such that the front frame 12 is rotatable relative to the rear frame 14. As will be described in further detail below, the joint 16 includes a spacer 60 configured to be adjacent or abut a sleeve assembly 58 coaxially mounted on the front frame 12. The front frame 12 includes a front fork 18 operatively coupled to a handlebar assembly 20. The front fork 18 includes a fork stem 22 and a pair of spaced apart forks or legs 24 extending therefrom in a generally parallel fashion. A front wheel 26 is positioned between the forks 24 and rotatably coupled to a front axle 28 so as to allow rotation of the front wheel 26 relative to the front frame 12.

With continued reference to FIG. 1, the handlebar assembly 20 includes a steering tube 30 configured to be operatively coupled to the fork stem 22 in a tool-less manner. In this regard, the rear frame 14 includes a head tube 34 configured to receive the fork stem 22 and steering tube 30 therethrough such that, when coupled together, the fork stem 22 and steering tube 30 are rotatably coupled to the rear frame 14 at joint 16, so as to allow the front frame 12 to rotate relative to the rear frame 14, and thereby change direction of the scooter 10 through rotation of the handlebar assembly 20. To this end, the handlebar assembly 20 includes a pair of handles 32 configured to be grasped by the rider for turning the scooter 10 in a desired direction. The handles 32 may include grips or other features that facilitate gripping by the user. Those of ordinary skill in the art will recognize that the handlebar assembly 20 may have a wide variety of shapes and designs and the invention is not limited to the particular embodiment shown herein.

The elements that form the front frame 12 may be formed from a variety of materials. For example, the handlebar assembly 20, steering tube 30, and front fork 18 may be formed from metal (e.g., metal tubing) and have a circular, oval, or other suitable cross-sectional shape. These materials and shapes are merely exemplary and it should be recognized that other materials and shapes may be used. In contrast, the handles 32, front wheel 26, and parts of the forks 24 may be formed from suitable engineering rubbers and plastics, including, for example, polypropylene, polyethylene or other suitable plastics. However, the invention is not so limited as the elements that form the front frame 12 may be formed from other suitable materials.

Figure 2:
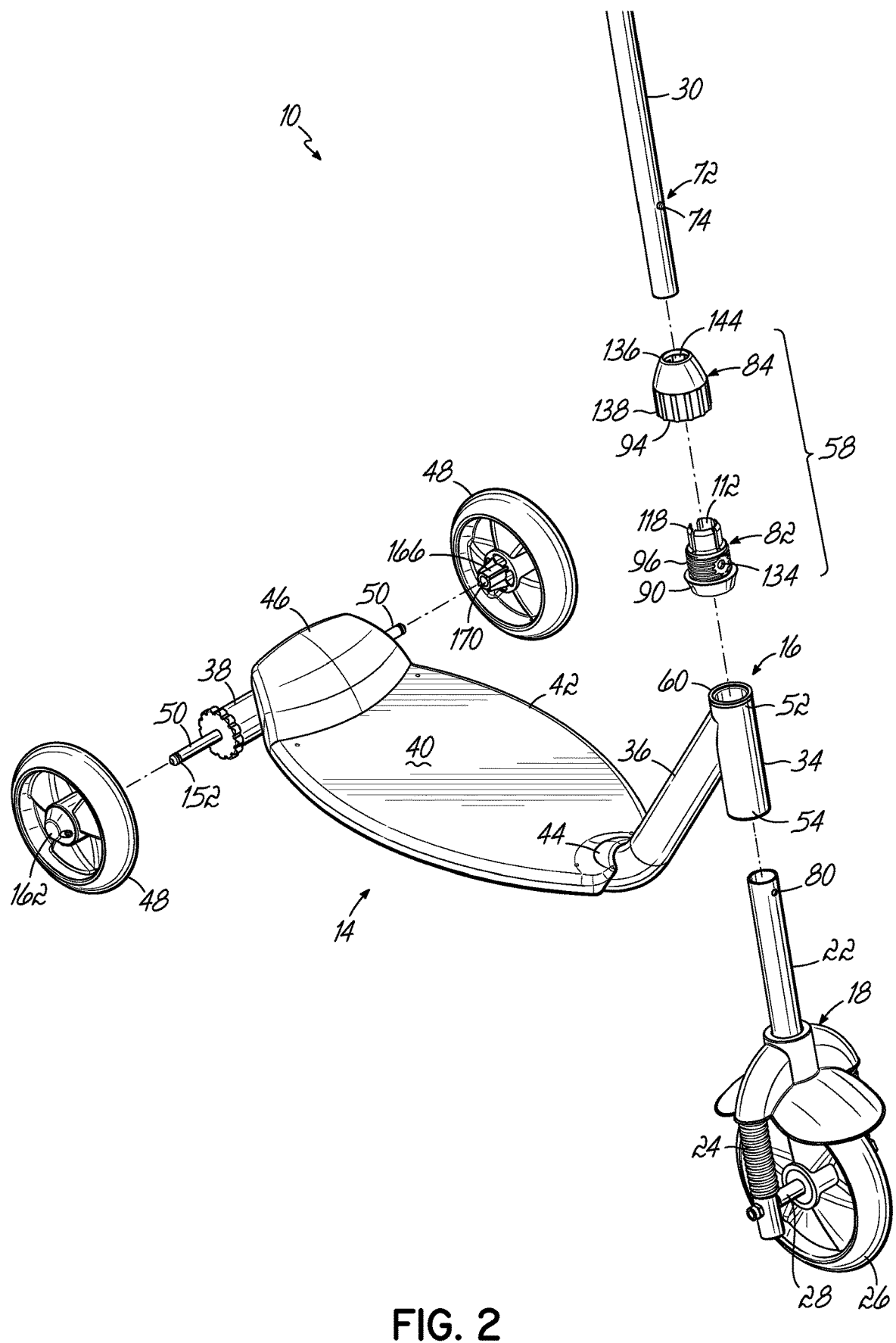
FIG. 2 is a disassembled perspective view of the scooter construction of FIG. 1.

With reference to FIGS. 1-2, the rear frame 14 includes the head tube 34, a first frame support element 36 coupled to the head tube 34 at one end thereof, and a second frame support element 38 coupled to the other end of the first support element 36. In one embodiment, the first support element 36 may include a generally tubular member having a relatively circular cross-sectional shape, however, other cross-sectional shapes may also be used. Additionally, the first support element 36 may, for example, include multiple supports extending from head tube 34 and is not limited to that shown herein.

The rear frame 14 further includes a deck 40, on which the rider of the scooter 10 stands, and a pair of rear wheels 48. In this regard, the second frame support element 38 defines a rear axle 50 to which the rear wheels 48 are rotatably coupled in a tool-less manner, as explained in more detail below. In one embodiment, the second frame support element 38 may include a generally tubular member having a relatively circular cross-sectional shape, however, other cross-sectional shapes may also be used. The second frame support element 38 is coupled to the first frame support element 36 at a midpoint along the second frame support element 38 and configured to laterally space the rear wheels 48 away from the first frame support element 36 and the deck 40. The second frame support element 38 may be, for example, coupled to the first support element 36 through a welding process or other suitable process. Furthermore, it will be appreciated that different configurations of the first and second frame support elements 36, 38, may be used, for example, to accommodate different deck 40 configurations.

The deck 40 may be configured to couple to at least one of the first or second frame support elements 36, 38, or both. In the exemplary embodiment, the deck 40 is configured to be coupled to, and generally overlie, the first frame support element 36. In this regard, the deck 40 may have a U-shaped member 44 which corresponds to the shape of the first frame support element 36. The deck 40 may include an upper, generally planar surface 42, a peripheral upturned lip or dovetail 46, and a bottom surface (not shown) opposite the upper planar surface 42. Additionally, the bottom surface may include one or more connecting members (not shown) configured to receive, for example, screws or other like fasteners, for securing the deck 40 to the rear frame 14.

The elements that form the rear frame 14 may be formed from a variety of materials. For example, the first and second frame support elements 36, 38, may be formed from metal (e.g., metal tubing) and have a circular, oval, or other suitable cross-sectional shape. However, these materials and shapes are exemplary and it should be recognized that other materials and shapes may be used. In contrast, the deck 40 may be molded from suitable engineering plastics, including, for example, polypropylene, polyethylene or other suitable plastics. However, the invention is not so limited as the elements that form the rear frame 14 may be formed from other suitable materials.

As noted above, consumers often find home assembly of scooters time consuming and frustrating. In this regard, it is believed that a relatively large percentage of product returns are a result of the inability of the consumer to properly assembly the scooter. Such returns are not only costly and frustrating for retail stores, but are also costly to manufacturers. To address this issue, scooter 10 includes a number of features to simplify assembly. One such feature is the tool-less coupling between the front and rear frames 12, 14. The details of such a tool-less coupling will now be described.

Referring now to FIGS. 1-3E, in accordance with an aspect of the invention and as described above, the front frame 12 may be coupled to the rear frame 14 in a tool-less manner. As shown, the front frame 12 couples to the rear frame 14 via the head tube 34 and, more particularly, at joint 16. The head tube 34 includes a generally hollow cylindrical body having upper and lower open ends 52, 54, respectively, and through which at least a portion of the front frame 12 may be disposed. As shown, the diameter of the head tube 34 is slightly larger than the diameter of the fork stem 22 and the steering tube 30 of the front frame 12. Accordingly, the head tube 34 is configured to receive a portion of the steering tube 30 and fork stem 22 therein, as will be described in further detail below. However, to securely position and support the fork stem 22 and steering tube 30 of the front frame 12 within the head tube 34, yet allow relative rotation therebetween, the joint 16 includes spacer 60.

In the embodiment shown the spacer 60 is coupled to an upper end 52 of the head tube 34. Alternatively, a second spacer may be used, for example, at the lower end 54 of the head tube 34. The spacer 60 is configured to support the front frame 12 within the head tube 34, yet allow rotation of the front frame 12 relative to the head tube 34 and rear frame 14. The spacer 60 may be configured to reduce sharp edges associated with the head tube 34 and/or reduce the friction and pressure associated with pivoting motion of the rear frame 14 relative to the front frame 12. In one embodiment, the spacer 60 may be formed from a suitable plastic, although other materials are possible. The spacer 60 may come preassembled to the head tube 34. Alternatively, the spacer 60 may be secured to the head tube 34 in a tool-less manner, such as through a friction fit.

Figure 3A:
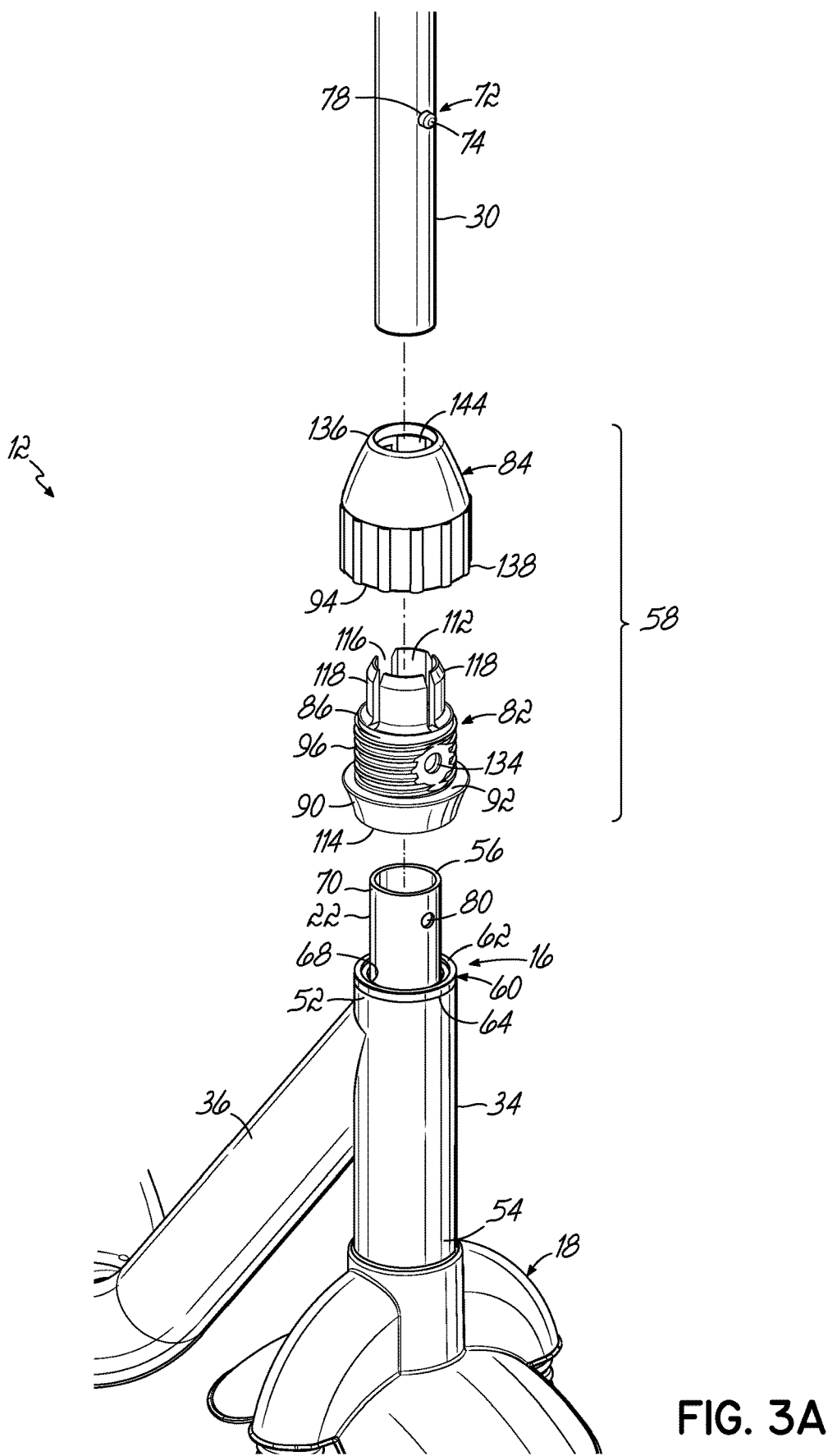
FIG. 3A is a disassembled perspective view of the front frame construction of FIG. 2.
Figure 3B:
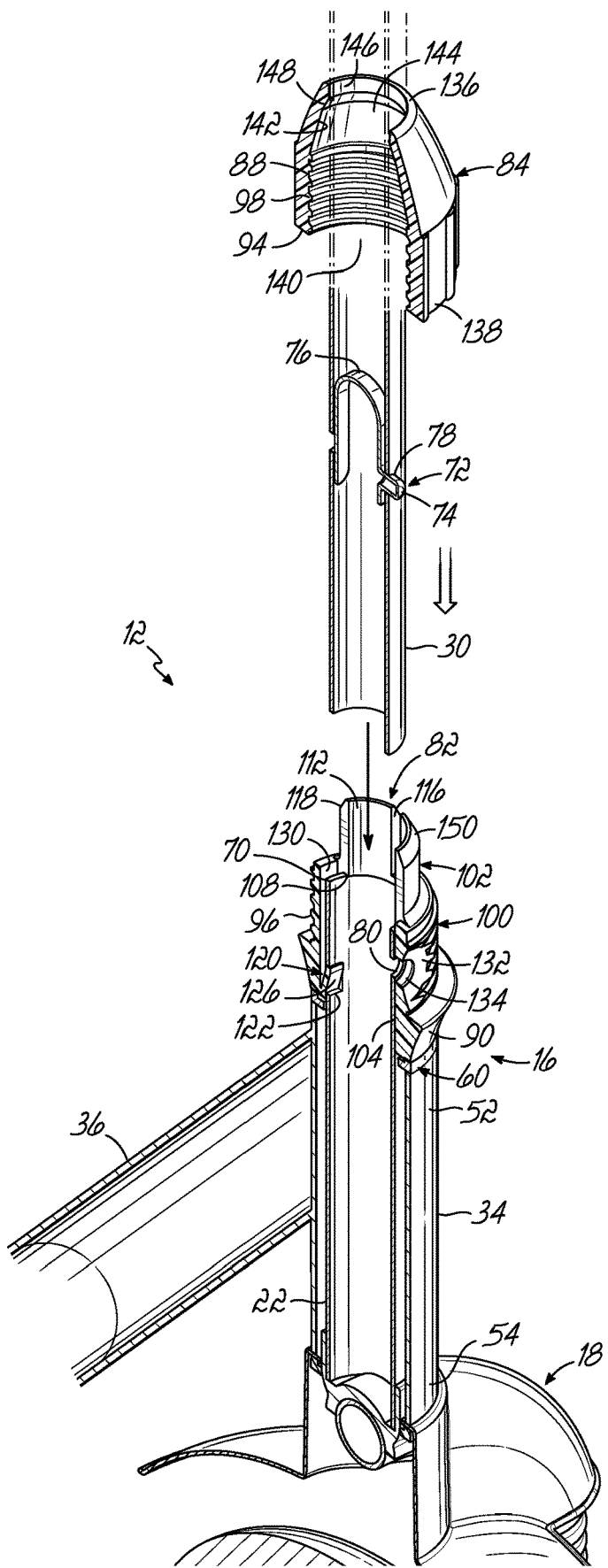
FIG. 3B is a view similar to FIG. 3A but shown in cross-section, illustrating assembly of the front frame to a rear frame in a tool-less manner.
Figure 3C:
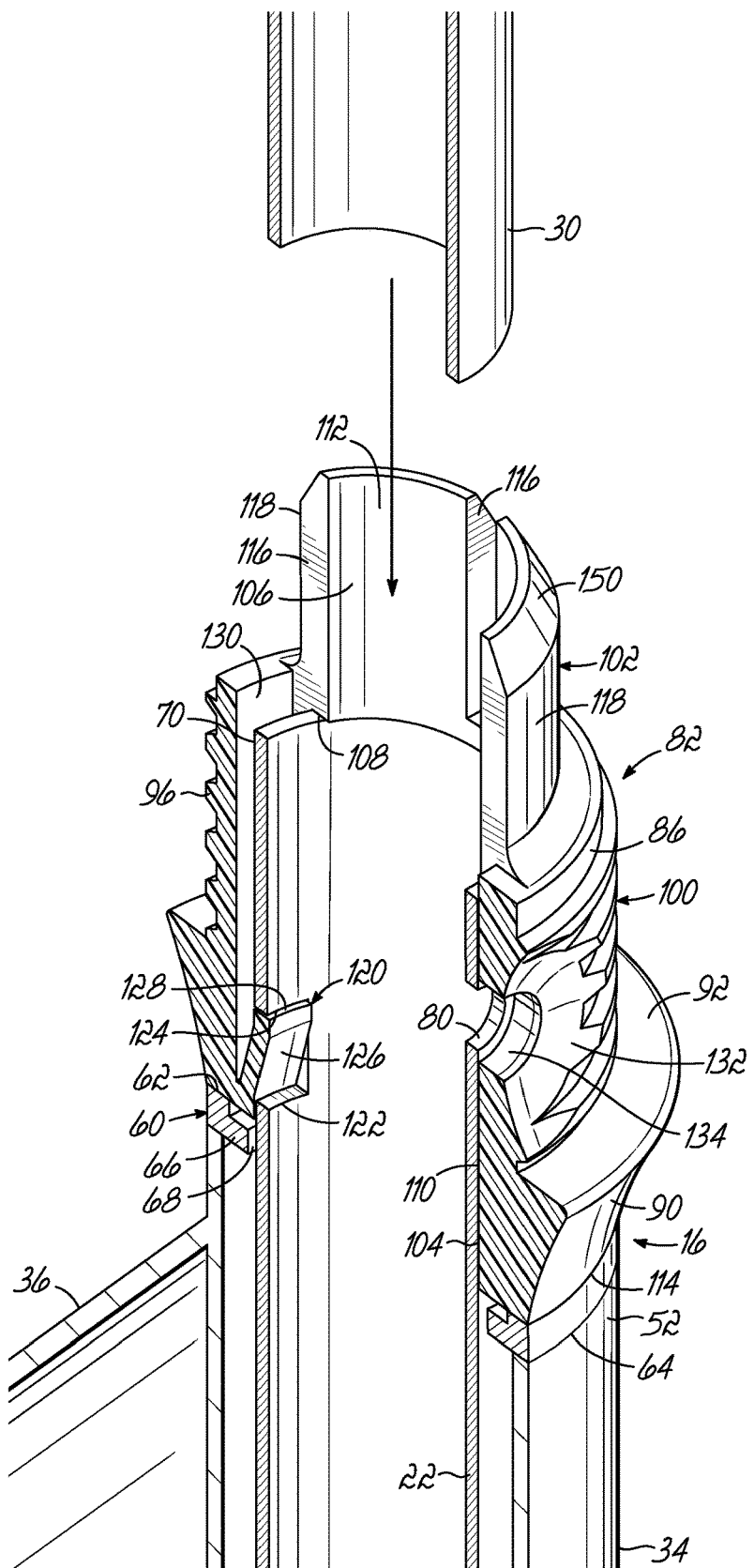
FIG. 3C is a view similar to FIG. 3B, illustrating assembly of a sleeve assembly according to one embodiment of the invention.
Figure 3D:
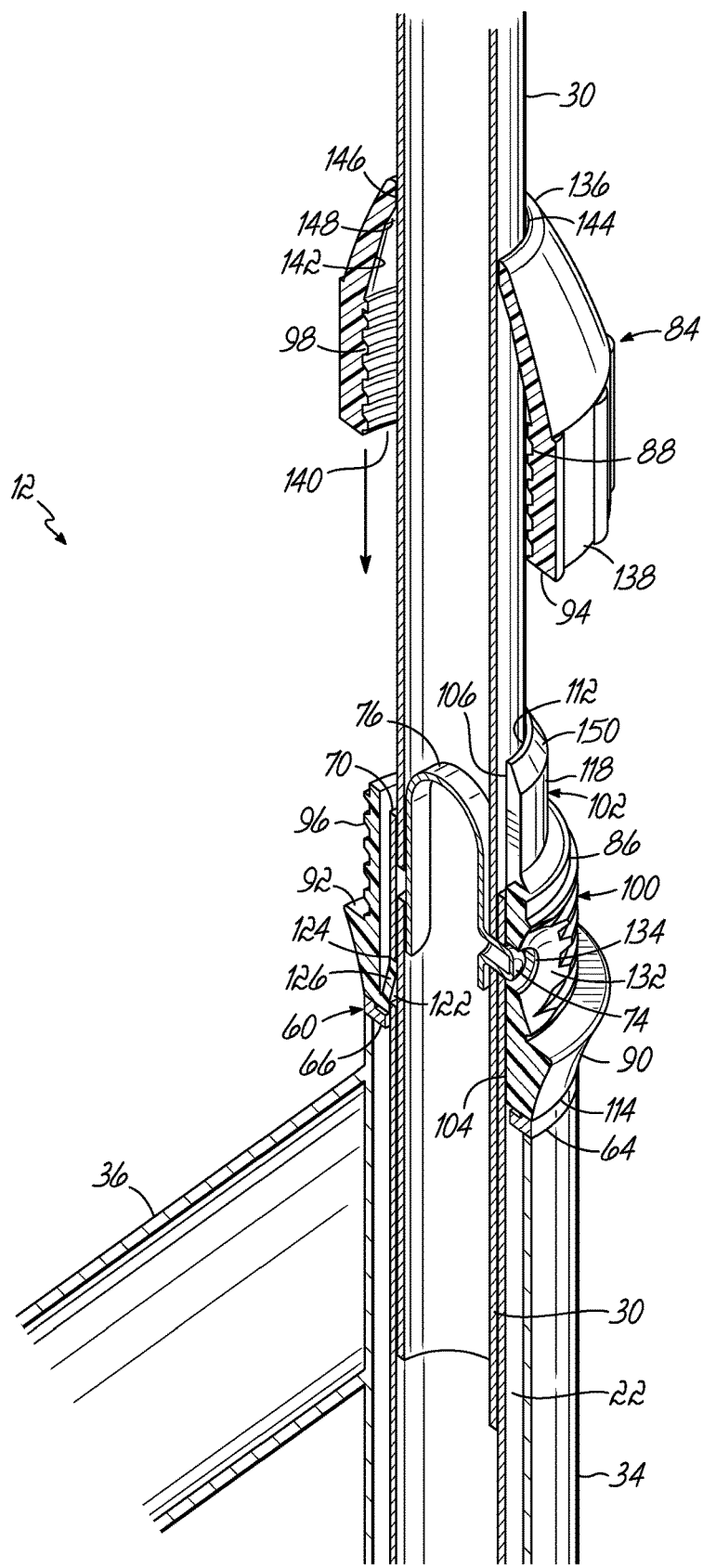
FIG. 3D is a view similar to FIG. 3C, further illustrating assembly of the sleeve assembly.
Figure 3E:
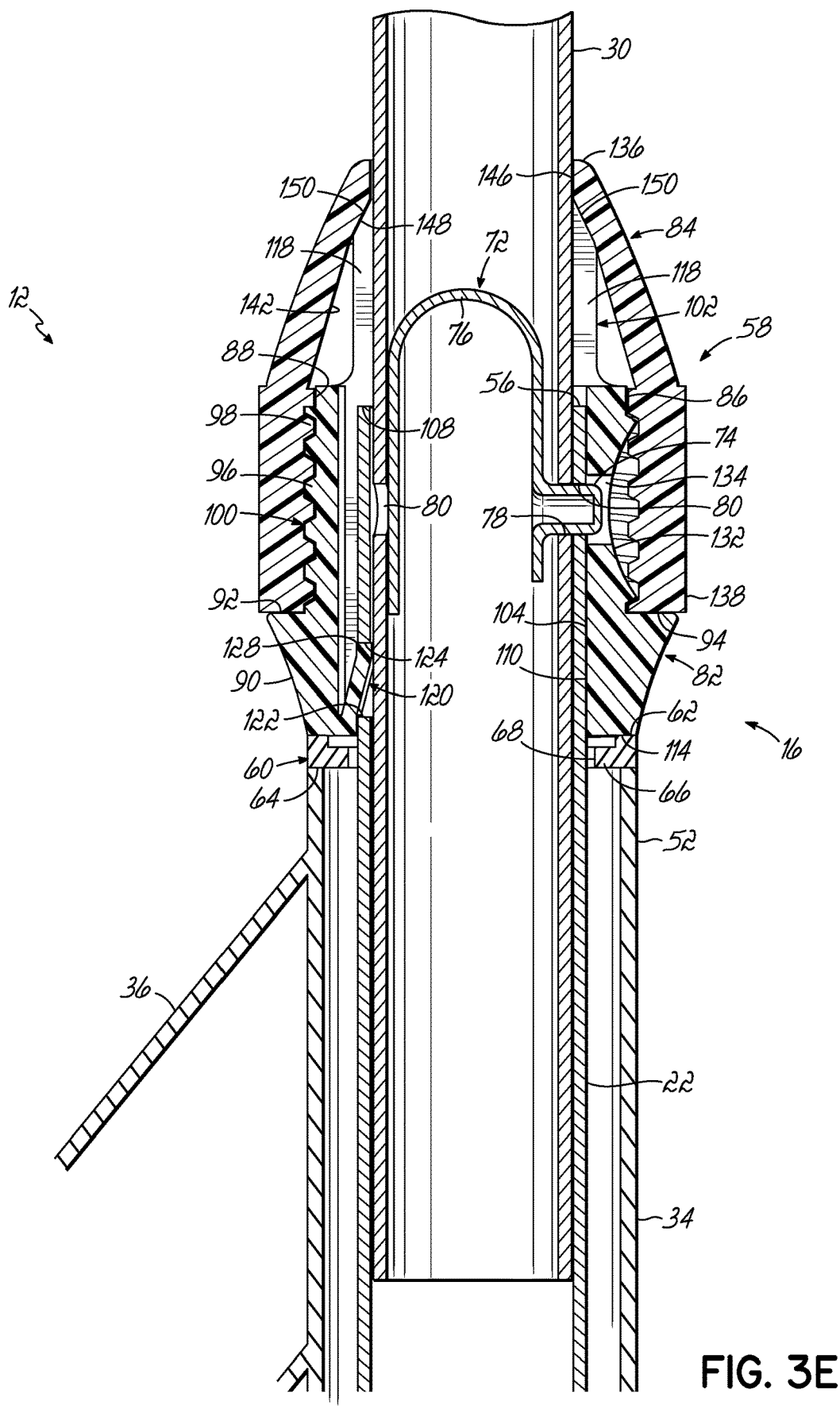
FIG. 3E is a cross-sectional view of the front frame coupled to the rear frame in a tool-less manner according to the embodiment shown in FIGS. 3A-3D.

As best shown in FIGS. 3A-3E, the spacer 60 includes an upper surface 62 that generally corresponds to the wall thickness of the head tube 34 and a lower surface 64 that includes an annular extension portion 66 (shown in FIG. 3E). The lower surface 64 is configured to be coupled to the upper end 52 of the head tube 34 and the upper surface 62 is configured to be adjacent or abut the sleeve assembly 58, as discussed in more detail below. The annular extension 66 of the spacer 60 extends radially inward and defines an aperture 68 configured to snugly, but movably, receive the fork stem 22 therethrough. In this regard, aperture 68 is sized for the purposes of vertically and securely positioning the fork stem 22 within the head tube 34 yet allowing for relative rotation therebetween.

With reference to FIG. 3A, the fork stem 22 may be configured to be inserted through the head tube 34 such that an upper end 70 of the fork stem 22 extends above the upper end 52 of the head tube 34 and the spacer 60. In this regard, a tool-less connector or locking mechanism may be used to secure the steering tube 30 to the upper end 70 of the fork stem 22. The tool-less coupling between the steering tube 30 and the fork stem 22 of the scooter 10 makes use of circular geometries and, in particular, the steering tube 30 has a generally circular cross-sectional shape. Additionally, the fork stem 22, which further includes an end or upper surface 56, has a shape that corresponds to the shape of the steering tube 30 and, in the exemplary embodiment, is generally circular in cross-sectional shape. The size of the steering tube 30 may be slightly smaller than the size of the fork stem 22 so that the steering tube 30 is telescopically received in the fork stem 22. As discussed in more detail below, the nested steering tube 30 is coupled to the fork stem 22 using a tool-less connector to prevent these elements from pulling apart from each other, for example, such as along a generally longitudinal direction.

In one embodiment, the coupling between the fork stem 22 and the steering tube 30 may be achieved through a push pin locking mechanism 72. However, those of ordinary skill in the art will recognize that other tool-less connectors may be used to couple the fork stem 22 and steering tube 30. As shown best in FIG. 3B, the push pin locking mechanism 72 may be disposed within the steering tube 30 adjacent an end thereof and include at least one projection or button 74 coupled to an end of a U-shaped spring member 76. The spring member 76 is configured to be frictionally received in the steering tube 30 and to bias the ends of the spring member 76 in an outward direction and away from each other. As the steering tube 30 is telescopically received in the fork stem 22, the at least one button 74 is biased slightly inwardly and extends only through an aperture 78 in the steering tube 30. Once the steering tube 30 has been sufficiently inserted into the fork stem 22, and the aperture 78 aligned with an aperture 80 formed through a wall of the fork stem 22, the button 74 is unconstrained and springs outwardly due to the bias of the spring member 76 to reside within both apertures 78, 80 (shown in FIG. 3D). When the button 74 is disposed within apertures 78, 80, the telescopic movement of the steering tube 30 relative to the fork stem 22 is prevented. In this regard, the handlebar assembly 20 is coupled to the front fork 18 and the front frame 12 coupled to the rear frame 14 via the head tube 34.

When the front frame 12 and rear frame 14 are coupled, the handlebar assembly 20 must be properly oriented and aligned relative to the front fork 18 to ensure proper operation. In this regard, as shown in FIG. 1, for example, when the handlebar assembly 20 is in the forward direction, the front wheel 26 is also in the forward direction. In an exemplary embodiment, the apertures 78 in the steering tube 30 may be circumferentially off-set from the handles 32 by approximately 90 degrees. Additionally, the apertures 80 in the fork stem 22 may be circumferentially off-set from the forks 24 by approximately 90 degrees. In this regard, when the steering tube 30 is coupled to the fork stem 22, the handlebar assembly 20 is properly oriented and aligned relative to the front fork 18. However, other degrees or positions of the apertures 78, 80, are also possible.

As discussed above, the push pin locking mechanism 72 prevents pulling apart and relative rotation between the steering tube 30 and fork stem 22 of the front frame 12. However, the front frame 12 may be secured in a manner that accommodates the load-bearing aspects from the rotation of the front frame 12 relative to the head tube 34 and rear frame 14. In this regard, the sleeve assembly 58 may be configured to minimize vertical movement of the front frame 12 relative to the head tube 34 and to support the loads experienced at the joint 16 from operation of the scooter 10. Moreover, the sleeve assembly 58 may be configured to protect the exposed push button 74 from being accidentally or otherwise unintentionally disengaged, as discussed in further detail below. As illustrated, the sleeve assembly 58 is comprised of a generally tubular body that is configured to be coaxially mounted onto the front frame 12 such that the sleeve assembly 58 is adjacent to or abuts the spacer 60 and rotationally engages the rear frame 14 at joint 16. As shown, the sleeve assembly 58 is configured to receive the upper end 70 of the fork stem 22 that extends above the upper end 52 of the head tube 34, including the portion of the steering tube 30 that is nested in, and coupled to, the fork stem 22. The lower end 54 of the head tube 34 is configured to engage with an abutment surface on the front fork 18. As discussed in further detail below, placing the sleeve assembly 58 on the exterior of the front frame 12 enhances alignment and securely retains the front frame 12 in place in the head tube 34 of the scooter 10, yet still allows for relative rotation therebetween.

With continued reference to FIGS. 3A-3E, the sleeve assembly 58 includes inner and outer sleeves 82, 84, which are, in the preferred embodiment, slideably mounted to the front frame 12 and configured to be threadably secured together near the tool-less connection point between the steering tube 30 and the fork stem 22. In this regard, when threadably joined together, the sleeve assembly 58 is configured to cover the exposed pin locking mechanism 72. In the exemplary embodiment, an external surface 86 of the inner sleeve 82 is provided with male threads 96 configured to receive the outer sleeve 84 that is provided with female threads 98 formed on an inner surface 88. The inner sleeve 82 may further include an annular flange 90 with a bearing surface 92 configured to receive an annular rim 94 of the outer sleeve 84. To this end, the outer and inner sleeves 84, 82, when fully seated and threadably joined together, may form a smooth junction therebetween. The inner and outer sleeves 82, 84, may be formed from suitable engineering plastics, including, for example, polypropylene, polyethylene or other suitable plastics. However, the invention is not so limited as the elements that form the front frame 12 may be formed from other suitable materials.

As shown in detail in FIG. 3C, the inner sleeve 82 is provided with a fork stem receiving portion 100 and a steering tube receiving portion 102. The fork stem receiving portion 100 includes an inner surface 104 defined by a central aperture 110. Additionally, the steering tube receiving portion 102 includes an inner surface 106 defined by a central aperture 112 wherein the inner surfaces 104, 106, are separated by a shoulder 108. As shown, the fork stem receiving portion 100 is adapted to slideably engage the front frame 12 and defines a shape that corresponds to the shape of the fork stem 22, which is tightly received in aperture 110. The steering tube receiving portion 102 is adapted to slideably engage the steering tube 30 of the front frame 12 and defines a shape that corresponds to the shape of the steering tube 30 which may be tightly received in aperture 112. The steering tube receiving portion 102 includes a plurality of spaced axially extending slots 116 (shown as four slots in the exemplary embodiment), for dividing the steering tube receiving portion 102 into a plurality of tabs 118. The coupling of the inner and outer sleeves 82, 84, creates an engagement between the tabs 118 and the steering tube 30, as described in further detail below.

The inner sleeve 82 may slide downwardly along the front frame 12 such that the upper end 70 of the fork stem 22 is telescopically received in aperture 110 of the inner sleeve 82. When the upper end 70 fork stem 22 is fully nested or seated in the fork stem receiving portion 100, the upper surface 56 of the fork stem 22 is adjacent or abuts the shoulder 108 of the inner sleeve 82. In this regard, the fork stem receiving portion 100 is configured to fully receive the exposed upper end 70 of the fork stem 22 such that, when fully received, a rear annular surface 114 of the inner sleeve 82 abuts the upper surface 62 of the spacer 60. The rear annular surface 114 is configured such that, when fully seated and adjacent to the spacer 60, forms a smooth junction therebetween. The rear annular surface 114 is adapted for operative engagement with the upper surface 62 of the spacer 60, allowing for relative rotation therebetween. To maintain this engagement, the inner sleeve 82 may be coupled to the fork stem 22 in a tool-less manner, as discussed in additional detail below.

With continued reference to FIG. 3C, the tool-less connection between the inner sleeve 82 and the fork stem 22 may be made with a spring clip 120 that engages a corresponding aperture 122 on the fork stem 22. The aperture 122 may be formed further down and 180 degrees around the circumference of the fork stem 22 from aperture 80. To this end, the location of the aperture 122 corresponds to the location of the spring clip 120 so that, when coupled, the fork stem 22 is held in place within the head tube 34, preventing any vertical movement yet still allowing for relative rotation therebetween. However, those of ordinary skill in the art will recognize that other degrees or positions of the aperture 122 are also possible. The aperture 122 defines a planar bearing surface 124 and is sized to receive a portion of a leg member 126 of the spring clip 120 therein. In this regard, a base 128 of the leg member is configured to engage the planar bearing surface 124 when the spring clip 120 is coupled thereto.

As shown, the spring clip 120 may have a generally V-shaped configuration and may be formed in a recess 130 in the inner surface 104 of the fork stem receiving portion 100. The recess 130, which extends axially along the inner surface 104, positions the spring clip 120 adjacent to the rear annular surface 114 of the inner sleeve 82 and allows for the inward flexing of the spring clip 120. Thus, the spring clip 120, and more particularly, the leg member 126, operates as a spring being capable of flexing inwardly towards the recess 130, but being resiliently biased outwardly away from the recess 130. In one embodiment, the leg member 126 of the spring clip 120 may project outwardly and upwardly from the recess 130, forming an acute angle relative to the inner surface 104. The acute angle may be, for example, between 5 and 75 degrees. Other acute angles may also be possible, however.

When the inner sleeve 82 is slid downwardly along the fork stem 22, the spring clip 120 is placed under tension and biased inwardly into the recess 130 thereby allowing the fork stem 22 to slide into the fork stem receiving portion 100 of the inner sleeve 82. As illustrated in FIG. 3C, when the inner sleeve 82 nears its fully seated position relative to the fork stem 22, the spring clip 120 encounters the aperture 122 such that the spring clip 120 snaps outwardly so as to position the leg member 126 within the aperture 122. In this regard, the shoulder 108 provides a stop for the fork stem 22, preventing over-insertion of the fork stem 22 into the inner sleeve 82. Accordingly, when the upper surface 56 of the fork stem 22 abuts the shoulder 108, the spring clip 120 engages the aperture 122. When the leg member 126 snaps into the aperture 122, the inner sleeve 82 is secured to the fork stem 22 in a tool-less manner. As such, if the fork stem 22 is pulled outwardly (away from the inner sleeve 82 and steering tube 30), the bearing surface 124 of the aperture 122 engages the base 128 of the spring clip 120 so as to prevent or limit any substantial outward movement of the fork stem 22.

After the inner sleeve 82 has been coupled to the fork stem 22, as described above, the consumer may need to make or adjust the connection between the steering tube 30 and the fork stem 22. Thus, this requires that the button 74 of the push pin locking mechanism 72 be accessible to the consumer. In this regard, the inner sleeve 82 may include a dimple or recess 132 formed in the external surface 86 of the inner sleeve 82 with a centrally formed aperture 134. As best shown in FIGS. 3D-3E, the aperture 134 is configured to receive the button 74 of the push pin locking mechanism 72 therein. In this embodiment, the inner sleeve 82 is configured to align aperture 134 with apertures 78, 80, when coupled to the fork stem 22. Thus, when the inner sleeve 82 is coupled to the fork stem 22 and the steering tube 30 coupled thereto, the button 74 is disposed within apertures 78, 80, 134, and accessible by the consumer. Accordingly, to de-couple the steering tube 30 from the fork stem 22, the button 74 may be pushed inwardly until the button 74 disengages from apertures 80 and 134. In this regard, the recess 132 further facilitates the disengagement of the button 74 from apertures 80 and 134. However, to prevent, for example, an accidental de-coupling of the front frame 12 components, the outer sleeve 84 is configured to cover the exposed button 74, as discussed in further detail below.

Referring to FIG. 3D-3E, the outer sleeve 84, having a generally frustoconical shape, is provided with a front end 136 and a rear end 138. The rear end 138, defined by a central aperture 140, is configured to threadably receive the external surface 86 of the inner sleeve 82 therein, as described above. In the exemplary embodiment, the height of the inner surface 88 of the outer sleeve 84 is substantially similar to the height of the external surface 86 of the inner sleeve 82. The internal side of the front end 136 includes an angled annular surface 142 extending from the inner surface 88 to a centrally formed aperture 144. The aperture 144 defines a longitudinally extending annular surface 146 adapted for slideably engaging the steering tube 30. The aperture 144 is configured to snugly, but movably, receive the steering tube 30 therethrough. The angled annular surface 142 may further include a beveled surface 148, adjacent to the annular bearing surface 146 and, configured to engage the plurality of tabs 118 of the inner sleeve 82, as described in further detail below.

As shown, the outer sleeve 84 is slid downwardly along the steering tube 30 such that the inner sleeve 82 is received in aperture 140 of the outer sleeve 84. Rotation of the outer sleeve 84 causes the threads 98 of the outer sleeve 84 to engage the threads 96 of the inner sleeve 82. By continued rotation, the inner sleeve 82 and outer sleeve 84 are joined together such that the annular rim 94 of the outer sleeve 84 abuts the flange 90 of the inner sleeve 82, forming a smooth junction therebetween, as best shown in FIG. 3E. In this regard, as the outer sleeve 84 is threaded downwardly on the inner sleeve 82, the beveled surface 148 is configured to engage a beveled edge 150 of each of the tabs 118 on the inner sleeve 82. Accordingly, the radial pressure exerted by the outer sleeve 84 on the beveled edges 150 of the tabs 118 reduces the radial diameter of the steering tube receiving portion 102 of the inner sleeve 82, thereby causing the steering tube receiving portion 102 to be radially compressed to exert a compressive, gripping force against the exterior surface of the steering tube 30 contained therein. Because of the tapered nature of each of the beveled edges 150, the gripping pressure exerted against the steering tube 30 will increase until the outer sleeve 84 is fully seated and threadably coupled to the inner sleeve 82. In the exemplary embodiment, the beveled edge 150 and beveled surface 148 may be sized so that mutual contact is maintained therebetween when the outer sleeve 84 is coupled to the inner sleeve 82. To this end, the gripping force exerted against the exterior of the steering tube 30 by the sleeve assembly 58 reduces the axial and rotational movement of the steering tube 30 relative to the fork stem 22. Furthermore, this engagement reduces the loads experienced by the push pin locking mechanism 72 as well as more tightly and securely couples the handlebar assembly 20 to the front fork 18, reducing any "play" between the two components. As previously discussed, the outer sleeve 84 covers the exposed button 74 of the push pin locking mechanism 72 and protects it from being accidentally or otherwise unintentionally disengaged.

Turning now to FIGS. 4-6B, with continued reference to FIGS. 1-2, another tool-less feature of the scooter 10 will now be described. In one aspect in accordance with the invention, the rear wheels 48 may be rotatably coupled in a tool-less manner to the rear frame 14 of the scooter 10. While the scooter 10 shown herein includes two rear wheels 48, it should be recognized that the scooter 10 may include more or less than two rear wheels 48. The rear frame 14, and thus the second frame support element 38 and the axle 50, are configured to laterally space the rear wheels 48 away from the first frame support element 36 and the deck 40, as best shown in FIG. 2. To facilitate a tool-less coupling between the rear wheel 48 and the axle 50, the axle 50 includes an annular groove 152 adjacent a distal end thereof. Additionally, the rear wheel 48 may include a tool-less connector configured to cooperate with the annular groove 152 in a manner that secures the rear wheel 48 to the axle 50 without the use of tools, as described in further detail below.

Figure 4:
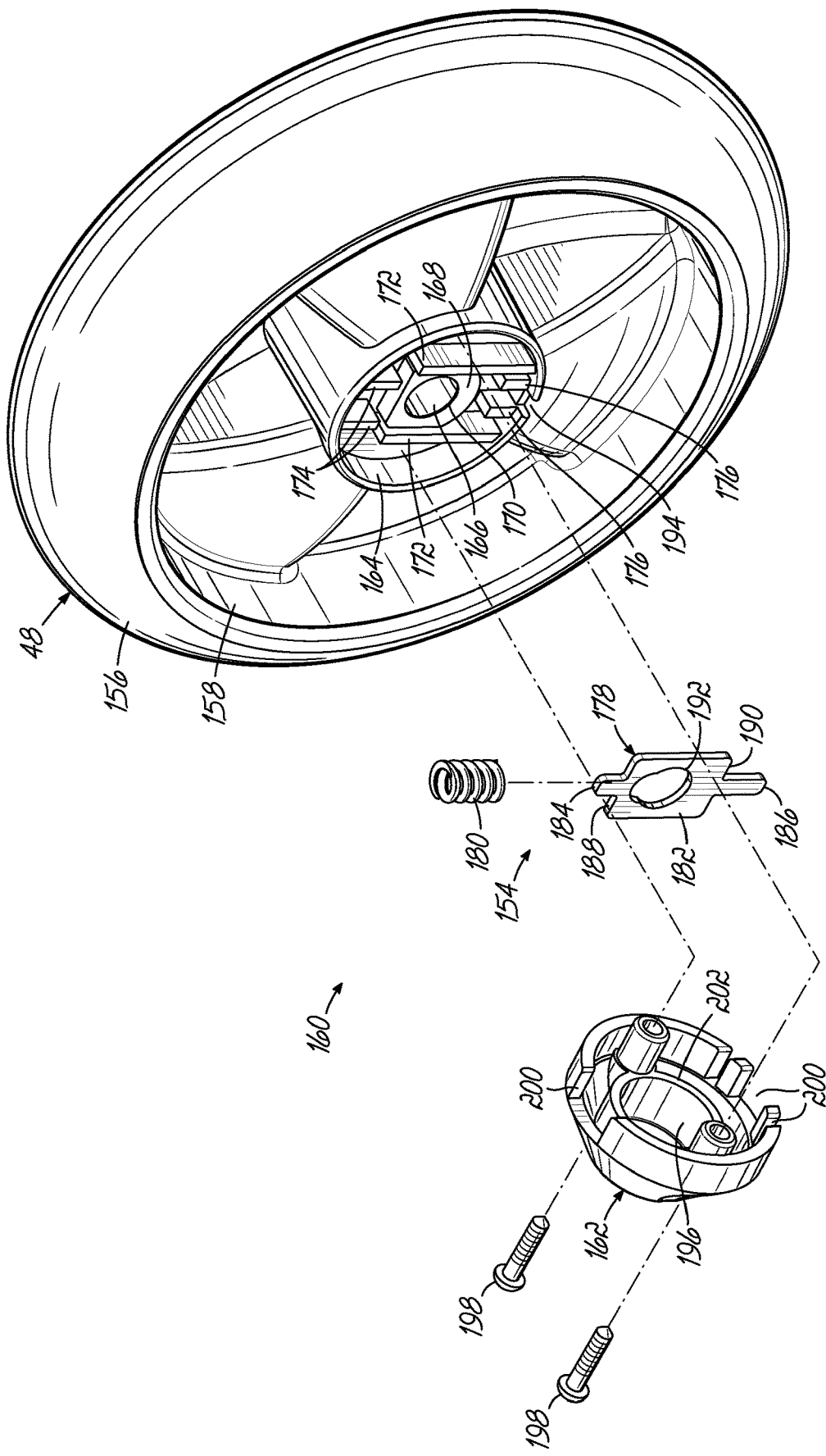
FIG. 4 is a disassembled perspective view of a rear wheel and hub assembly in one embodiment in accordance with aspects of the invention.

Referring now to FIG. 4, the rear wheel 48 may include a tire 156 supported by a rim 158 which includes a centrally located hub assembly 160. The hub assembly 160 includes an end cap 162, a tool-less locking mechanism 154, and a retainer housing 164. The retainer housing 164 may include a wheel mounting sleeve 166, defining a raised surface 168, including an aperture 170 configured to receive the rear axle 50 therethrough. The retainer housing 164 may also include a plurality of raised projections, including one or more guides 172, upper stops 174, and lower stops 176, configured to slideably secure the locking mechanism 154 within the hub assembly 160. In one embodiment, the locking mechanism 154 may be, for example, a spring biased locking mechanism having a push button. As shown, the locking mechanism assembly 154 includes a locking element 178 and a spring member 180. The locking element 178 is generally rectangular in shape, having a main body 182 with an upper tab 184 and a lower tab or push button 186. In this regard, the upper tab 184 defines a set of upper shoulders 188, and the lower tab 186 defines a set of lower shoulders 190. The main body 182 of the locking element 178 may further include an aperture 192 with a shape that generally corresponds to the shape of the axle 50. In the exemplary embodiment, the aperture 192 is generally oval in cross-sectional shape. As shown, the aperture 192 generally tapers down from a lower portion near the lower tab 186 to an upper portion near the upper tab 184. In this regard, the radius of the upper portion of the aperture 192 is sized slightly smaller compared to the radius of the lower portion of the aperture 192 which is sized to closely receive the axle 50 therethrough.

With continued reference to FIG. 4, the retainer housing 164 is configured to slideably receive the locking element 178 therein such that the locking mechanism is slideable between a first, locked position, and a second, unlocked position, as will be described in further detail below. In one embodiment, the locking element 178 may be disposed on the raised surface 168 of the wheel mounting sleeve 166 and between the two vertical guides 172. As illustrated, the guides 172 may project from the retainer housing 164 to a height greater than the height the raised surface 168 by a distance substantially similar to the thickness of the locking element 178, for reasons that will become clearer below. The upper stops 174 may be located vertically above the raised surface 168, and may project to a similar height as the guides 172. The upper stops 174 may be configured to receive the spring 180 of the locking mechanism 154 therebetween, such that the upper tab 184 of the locking element 178 is disposed within the confines of the coil of the spring 180. In this regard, the spring 180 engages the upper shoulders 188 of the locking element 178 and the retainer housing 164. As a result of this engagement, the spring 180 applies force in a downward direction, biasing the locking element 178 downward, in a direction towards the lower stops 176. The lower stops 176 may be located below the raised surface 168, and may project to a similar height as the guides 172 and the upper stops 174. The lower stops 176 are configured to snugly receive the push button tab 186 therebetween, yet still allow for vertical movement of the locking element 178. Furthermore, the lower stops 176 are configured to engage the lower shoulders 190 of the locking element 178, prohibiting the locking element 178 from moving too far in a downward direction as a result of the bias from the spring 180. As shown, the push button tab 186 may extend through a notch 194 in the retainer housing 164 and configured to be accessible by the consumer.

The end cap 162 is configured to couple to the retainer housing 164 and minimize horizontal movement of the elements of the locking mechanism 154. In one embodiment, the end cap 162 may have a frustoconical shape including an inner bore 196 configured to receive a portion of the axle 50 therein. The end cap 162 may be coupled to the retainer housing 164 through the use of a plurality of fasteners 198, such as screws or the like. As illustrated, sides of the end cap 162 are partially received within the confines of the retainer housing 164 when coupled thereto. Accordingly, the end cap 162 may further include a plurality of notches 200 configured to receive the raised portions of the retainer housing 164 and the push button tab 186 therein when the end cap 162 is coupled to the retainer housing 164. In this regard, when the end cap 162 is coupled to the retainer housing 164, an annular rim 202 of the bore 196 is adjacent to or abuts the plurality of raised portions 172, 174, 176, and substantially inhibits the horizontal movement of the spring 180 and locking element 178, yet still allows for slideable or vertical movement of the locking element 178 therebetween.

Figure 5B:
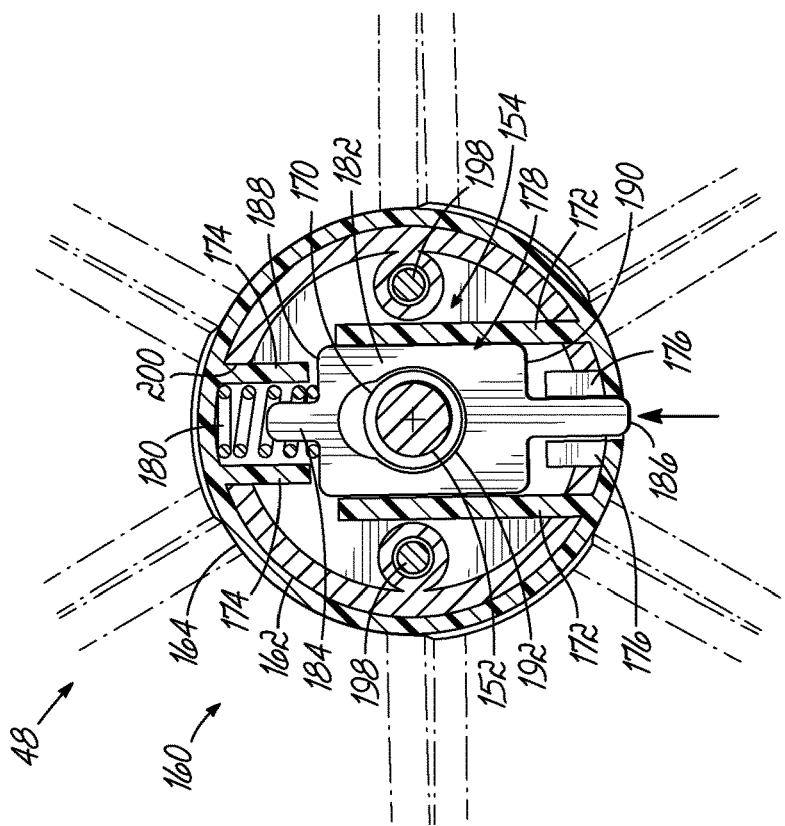
FIG. 5B is a cross-sectional view of the rear wheel and hub assembly illustrating a locking mechanism in an unlocked position according to the embodiment shown in FIG. 4.
Figure 5A:
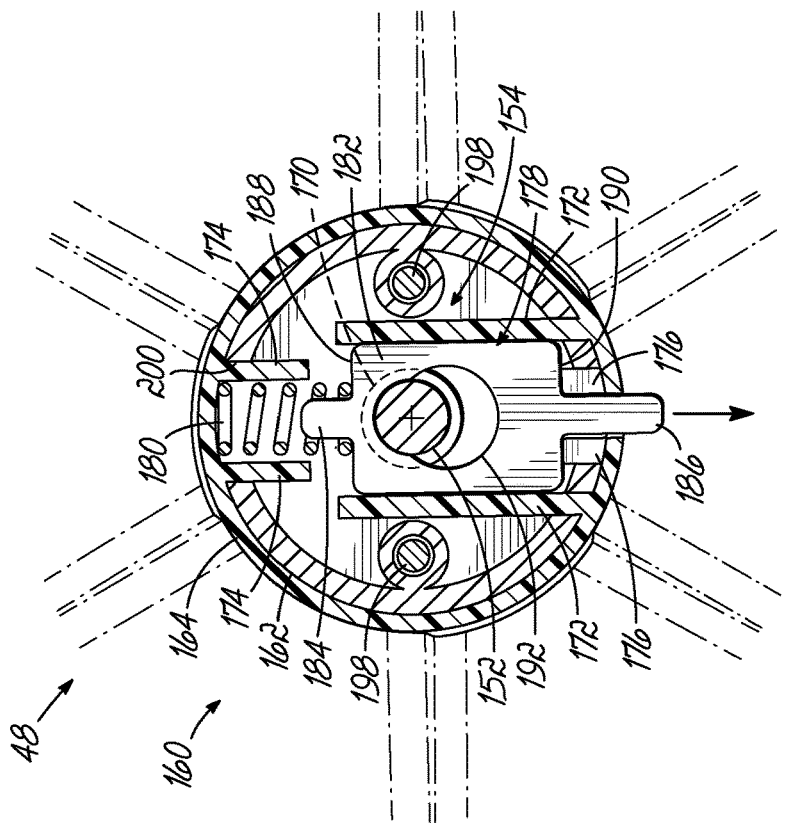
FIG. 5A is a cross-sectional view of the rear wheel and hub assembly illustrating a locking mechanism in a locked position according to the embodiment shown in FIG. 4.

Referring now to FIG. 5A, the locking mechanism is shown in the locked position. In the locked position, the locking element 178 is biased downwardly by the spring 180 and abuts the lower stops 176, as previously described. In this regard, the main body 182 is slid downward such that a portion the main body 182 partially covers or overlays aperture 170, such that apertures 170 and 192 are no longer aligned. The portion of the main body 182 that covers the aperture 170 corresponds generally to the depth of the annular groove 152 formed in the axle 50, as described in further detail below. As shown, the push button tab 186 may extend out of the retainer housing 164 and be accessible to the consumer for maneuvering. Turning now to FIG. 5B, the locking mechanism is shown in the unlocked position. When the push button tab 186 is depressed, the spring 180 is compressed and the locking element 178 is slid in an upward direction until the upper shoulders 188 abut or nearly abut the upper stops 174. Accordingly, the locking mechanism is in the unlocked state. As illustrated, the locking element 178 may be configured such that, in the unlocked state, aperture 192 is substantially aligned with aperture 170, and the axle 50 may be disposed therebetween. When the push button tab 186 is released, the locking element 178 is biased downwardly to its default, locked position, as a result of the bias of the spring 180.

The elements that form the hub assembly 160 may be formed from a variety of materials. For example, the locking element 178 and spring 180 may be formed from a suitable material, including various metals or plastics configured to withstand the loads imposed thereon. In contrast, the retainer housing 164 and end cap 162 may be formed (e.g. injection or blow molded) from suitable engineering plastics including, for example, polypropylene, polyethylene or other suitable plastics. However, these materials and shapes are merely exemplary and it should be recognized that other materials and shapes may be used.

Figure 6A:
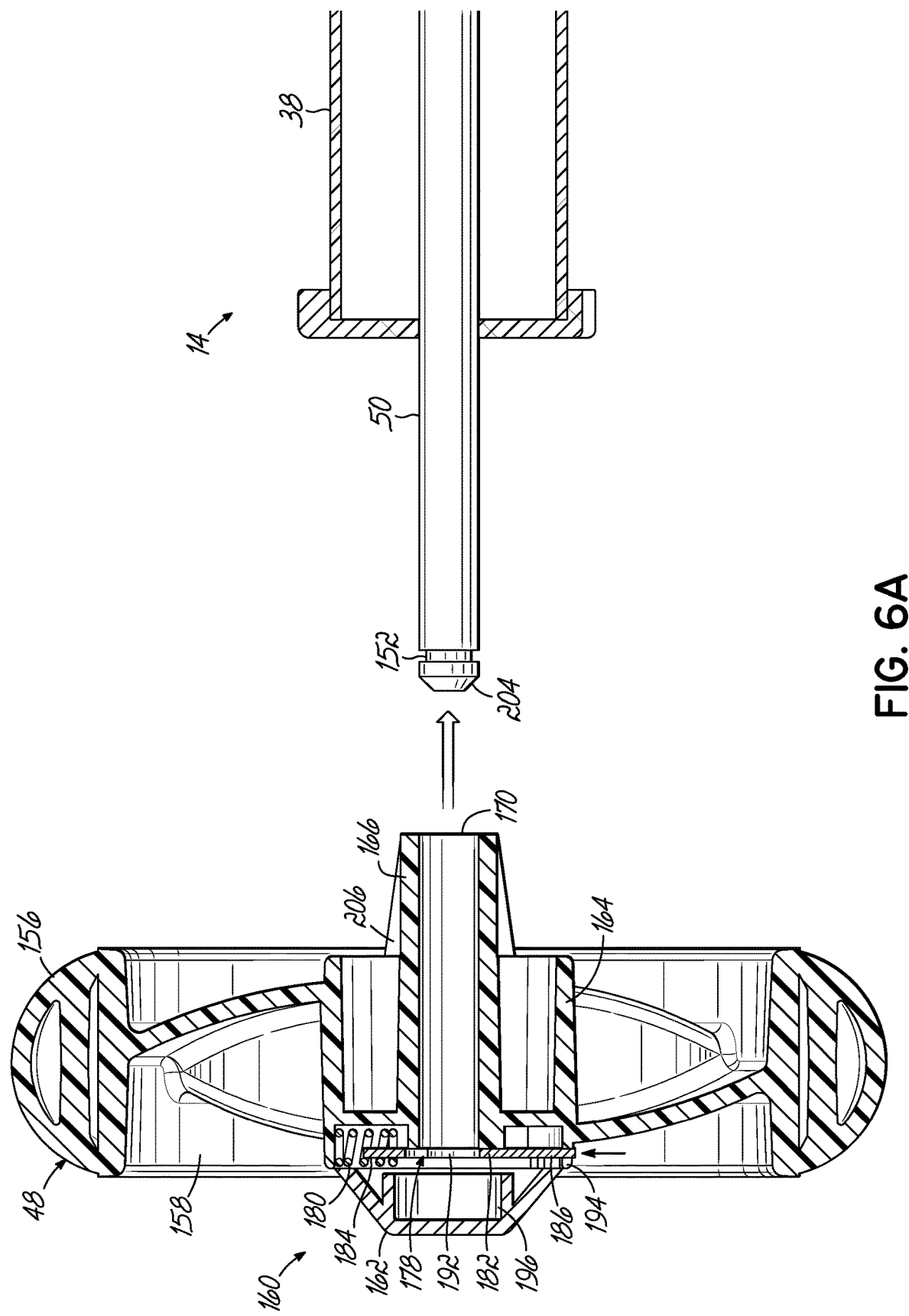
FIG. 6A is a cross-sectional view illustrating assembly of the rear wheel to an axle in a tool-less manner according to the embodiment shown in FIG. 4.

Referring now to FIGS. 6A-6B, the tool-less assembly of the rear wheel 48 to the axle 50 of the scooter 10 will now be described for the present embodiment. In this regard, the hub assembly 160 of the rear wheel 48 will typically be shipped to various retail outlets in an assembled state. As shown in FIG. 6A, the axle 50 may include a chamfered end 204 to facilitate insertion of the axle 50 into the wheel mounting sleeve 166. In one embodiment, the wheel mounting sleeve 166 may project from the rear wheel 48 to form a spacer 206 configured to space the rear wheel 48 from the rear frame 14 of the scooter 10. The rear wheel 48 is coupled to the axle 50 by inserting the chamfered end 204 and axle 50 into the wheel mounting sleeve 166. The wheel mounting sleeve 166 may be sized to closely receive the axle 50 yet allow for relative rotation therebetween. As shown, to permit the chamfered end 204 and axle 50 to pass through the hub assembly 160, the locking mechanism 154 may be in the unlocked position. Alternatively, the chamfered end 204 of axle 50 may move the locking mechanism from the locked position to the unlocked position by engagement with the aperture 192 as the axle 50 and the rear wheel 48 move relative to each other. As best illustrated in FIG. 6B, when the rear wheel 48 nears its fully seated position relative to the axle 50, the locking element 178, which is in the unlocked position as the axle 50 traverses the wheel sleeve and apertures 170, 192, may be released when positioned outside of the annular groove 152. In this regard, the locking element 178 is unconstrained and springs downwardly so as to position a portion of the locking element 178 within the annular groove 152. When so positioned, the locking mechanism 154, and thus the locking element 178, is in the locked position, wherein a portion of the main body 182 is in a confronting relationship with the axle 50, and the rear wheel 48 is rotationally secured to the axle 50 and the scooter 10. To this end, the tapered oval shape of the aperture 192 provides for increased contact area between the main body 182 and the axle 50. As shown, for example, when the rear wheel 48 is coupled to the axle 50, the chamfered end 204 may extend partially into the bore 196 of the end cap 162. When coupled, if the rear wheel 48 is pushed inwardly or pulled outwardly, the main body 182 of the locking element 178 is configured to engage the axle 50 so as to prevent any substantial inward or outward movement of the rear wheel 48.

In accordance with an aspect of the invention, the coupling of the rear wheel 48 to the axle 50 of the scooter 10 may be achieved in a tool-less manner. In this regard, the amount of force that it takes to maneuver the push button tab 186 and locking mechanism, as well as slide the rear wheel 48 onto the axle 50, is configured to be within the capacity of an adult person using his or her hands. Based on the above description, it should be appreciated that the coupling of the rear wheel 48 to the scooter 10, and the components of the front frame 12 to the rear frame 14, is therefore quick, relatively easy to understand and implement, and achieved without the need of any tools. Additionally, the mechanism(s) that provide for the tool-less assembly are relatively simple in their design and cost-effective in regard to manufacturing and implementation.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A method of tool-less assembly of a child vehicle, comprising:
   providing a front frame assembly including a handlebar having a steering tube and a front fork having a fork stem and a front wheel;
   providing a rear frame assembly having a head tube and at least one rear wheel;
   providing a sleeve assembly having an inner sleeve and an outer sleeve;
   inserting an end of the fork stem through the head tube;

sliding the inner sleeve over the end of the fork stem and positively connecting the inner sleeve to the fork stem in a tool-less manner, wherein a lower end of the head tube engages an abutment surface of the front fork and an upper end of the head tube engages the inner sleeve;
sliding the outer sleeve over an end of the steering tube;
connecting the steering tube to the fork stem in a tool-less manner; and
connecting the outer sleeve to the inner sleeve.

2. The method of claim 1, wherein positively connecting the inner sleeve to the fork stem in a tool-less manner further comprises:
providing the inner sleeve with a spring clip;
providing the fork stem with an aperture; and
engaging the spring clip with the aperture to positively connect the inner sleeve to the fork stem.

3. The method of claim 1, wherein connecting the steering tube to the fork stem in a tool-less manner further comprises:
providing one of the steering tube or fork stem with a spring-biased push pin;
providing the other of the steering tube or fork stem with an aperture; and
engaging the push pin with the aperture to positively connect the steering tube and fork stem.

4. The method of claim 3, further comprising:
engaging the push pin with an aperture in the inner sleeve; and
covering the push pin with the outer sleeve when the outer sleeve is connected to the inner sleeve.

5. The method of claim 1, wherein the inner sleeve includes a plurality of tabs, the method further comprising clamping the plurality of tabs to the steering tube when the outer sleeve is connected to the inner sleeve.

6. A child vehicle, comprising:
a front frame assembly including at least one front wheel;
a steerer for turning the at least one front wheel;
a rear frame assembly pivotally connected to the front frame assembly and including a rear wheel axle; and
a rear wheel positively connected to the rear wheel axle by a tool-less connector, wherein the tool-less connector comprises:
a locking element carried by the rear wheel and moveable between a locked position and an unlocked position; and
a groove in the rear wheel axle,
wherein at least a portion of the locking element resides in the groove when in the locked position to thereby restrict movement of the rear wheel relative to the rear wheel axle,
wherein no portion of the locking element resides in the groove when in the unlocked position to thereby allow movement of the rear wheel relative to the rear wheel axle, and
wherein the locking element includes an oval aperture having a first portion with a first radius and a second portion with a second radius, and wherein the second radius is smaller than the first radius.

7. The child vehicle of claim 6, wherein the tool-less connector further comprises a spring member to bias the locking element toward the locked position.

8. The child vehicle of claim 6, wherein the tool-less connector further comprises a push pin for moving the locking element from the locked position to the unlocked position.

9. The child vehicle of claim 6, wherein the second radius is less than the radius of the rear wheel axle and greater than the radius of the groove.

10. The child vehicle of claim 6, wherein the rear wheel axle is generally positioned within the first portion of the oval aperture when the locking element is in the unlocked position, and wherein the rear wheel axle is generally positioned in the second portion when the locking element is in the locked position.

11. A method of tool-less assembly of a child vehicle, comprising:
providing a front frame assembly including at least one front wheel;
providing a steerer for turning the at least one front wheel;
providing a rear frame assembly including a rear wheel axle;
providing a rear wheel including a central hub having a wheel mounting sleeve and a tool-less connector, the tool-less connector comprising a spring-biased locking element having a locked position and an unlocked position located in the central hub adjacent the wheel mounting sleeve and a groove formed in the rear wheel axle adjacent the end;
inserting an end of the rear wheel axle into the wheel mounting sleeve; and
connecting the rear wheel to the rear wheel axle using the tool-less connector, comprising
moving the locking element from the locked position to the unlocked position;
inserting the rear wheel axle through an aperture in the locking element;
moving the locking element to the locked position to engage a portion of the locking element within the groove of the rear wheel axle.

12. The method of claim 11, wherein moving the locking element from the locked position to the unlocked position further comprises:
engaging the end of the rear wheel axle with the aperture in the locking element; and
moving the locking element from the locked position to the unlocked position by the engagement of the rear wheel axle with the aperture in the locking element.

13. The method of claim 11, wherein moving the locking element from the locked position to the unlocked position further comprises manually moving the locking element from the locked position to the unlocked position.

14. The method of claim 11, wherein moving the locking element to the locked position further comprises moving the locking element to the locked position under a spring biasing force.

15. The method of claim 11, further comprising pivotally connecting the front and rear frame assemblies together.

16. A child vehicle, comprising:
a front frame assembly including a handlebar with a steering tube and a front fork having a fork stem and a front wheel;
a rear frame assembly including a head tube and at least one rear wheel; and
a sleeve assembly mounted to the front frame assembly and engaging the rear frame assembly to rotatably connect the front and rear frame assemblies in a tool-less manner,
wherein the sleeve assembly includes an inner sleeve and an outer sleeve connected to the inner sleeve,
wherein the inner sleeve is positively connected to the front frame assembly by a first tool-less connector, and
wherein the first tool-less connector comprises a spring clip on the inner sleeve and an aperture in the fork stem, and wherein when the spring clip is received in the aperture, the inner sleeve is positively connected to the fork stem.

17. The child vehicle of claim 16, wherein the inner sleeve includes a plurality of tabs, and wherein the plurality of tabs clamp on the front frame assembly when the outer sleeve is connected to the inner sleeve.

18. The child vehicle of claim 17, wherein the plurality of tabs clamp on the steering tube when the outer sleeve is connected to the inner sleeve.

19. The child vehicle of claim 16, wherein the steering tube and the fork stem are positively connected together by a second tool-less connector.

20. The child vehicle of claim 19, wherein the second tool-less connector is disposed in the sleeve assembly when the front and rear frame assemblies are rotatably connected together.

21. The child vehicle of claim 20, wherein the second tool-less connector comprises a spring-biased push pin in one of the steering tube or fork stem and an aperture in the other of the steering tube or fork stem, and wherein when the push pin is received in the aperture, the steering tube and fork stem are positively connected together.

22. The child vehicle of claim 21, wherein the inner sleeve includes an aperture and the push pin is received in the aperture of the inner sleeve when the front and rear frame assembles are rotatably connected together.

23. The child vehicle of claim 22, wherein the outer sleeve covers the push pin when the outer sleeve is connected to the inner sleeve.

24. The child vehicle of claim 16, wherein the child vehicle is a scooter.

25. A child vehicle, comprising:
  a front frame assembly including a handlebar with a steering tube and a front fork having a fork stem and a front wheel;
  a rear frame assembly including a head tube and at least one rear wheel; and
  a sleeve assembly mounted to the front frame assembly and engaging the rear frame assembly to rotatably connect the front and rear frame assemblies in a tool-less manner,
  wherein the sleeve assembly includes an inner sleeve and an outer sleeve connected to the inner sleeve, and
  wherein the inner sleeve includes a plurality of tabs, the plurality of tabs clamping on the front frame assembly when the outer sleeve is connected to the inner sleeve.

26. The child vehicle of claim 25, wherein the inner sleeve is positively connected to the front frame assembly by a first tool-less connector.

27. The child vehicle of claim 26, wherein the first tool-less connector comprises a spring clip on the inner sleeve and an aperture in the fork stem, and wherein when the spring clip is received in the aperture, the inner sleeve is positively connected to the fork stem.

28. The child vehicle of claim 25, wherein the plurality of tabs clamp on the steering tube when the outer sleeve is connected to the inner sleeve.

29. The child vehicle of claim 25, wherein the steering tube and the fork stem are positively connected together by a second tool-less connector.

30. The child vehicle of claim 29, wherein the second tool-less connector is disposed in the sleeve assembly when the front and rear frame assemblies are rotatably connected together.

31. The child vehicle of claim 30, wherein the second tool-less connector comprises a spring-biased push pin in one of the steering tube or fork stem and an aperture in the other of the steering tube or fork stem, and wherein when the push pin is received in the aperture, the steering tube and fork stem are positively connected together.

32. The child vehicle of claim 31, wherein the inner sleeve includes an aperture and the push pin is received in the aperture of the inner sleeve when the front and rear frame assembles are rotatably connected together.

33. The child vehicle of claim 32, wherein the outer sleeve covers the push pin when the outer sleeve is connected to the inner sleeve.

34. The child vehicle of claim 25, wherein the child vehicle is a scooter.

* * * * *